United States Patent [19]
Oishi et al.

[11] 3,846,796
[45] Nov. 5, 1974

[54] OPERATING METHOD AND SYSTEM FOR PREDICTING COLLISION

[75] Inventors: Kazuo Oishi, Oobu; Toshiaki Kato, Nishio; Takeshi Matsui, Kariya; Matatoyo Hinachi, Nagoya; Takashi Yamada, Anjo, all of Japan

[73] Assignee: Nippon Soken, Inc., Nishio-shi, Aichi-ken, Japan

[22] Filed: Jan. 15, 1973

[21] Appl. No.: 323,395

[30] Foreign Application Priority Data
Jan. 17, 1972   Japan.................................. 47-6736

[52] U.S. Cl................ 343/7.5, 343/9, 343/112 CA
[51] Int. Cl............................ G01s 9/24, G01s 9/46
[58] Field of Search ........ 343/17.5, 7.5, 9, 8, 12 R, 343/112 CA

[56] References Cited
UNITED STATES PATENTS

| | | | |
|---|---|---|---|
| 2,537,593 | 1/1951 | Landon et al..................... | 343/17.5 |
| 3,065,465 | 11/1962 | Wimberly .......................... | 343/17.5 |
| 3,216,010 | 11/1965 | Roeschke...................... | 343/7.5 UX |
| 3,713,151 | 1/1973 | Kofsky................................. | 343/7.5 |

*Primary Examiner*—Maynard R. Wilbur
*Assistant Examiner*—G. E. Montone
*Attorney, Agent, or Firm*—Cushman, Darby & Cushman

[57] ABSTRACT

An operating system for predicting collision is provided wherein a first wave of a reflected wave, which has been transmitted from an oscillator and reflected from a target, is received, a second wave having a frequency different from that of the first wave is caused to interfere with the first wave to produce a beat wave, and the frequency of the first and second waves is changed at a specified phase angle of the beat wave, whereby at least either one of the polarity of the beat wave and the amount of change of phase of the beat wave with respect to the changed frequency is detected.

5 Claims, 15 Drawing Figures

OPERATING METHOD AND SYSTEM FOR PREDICTING COLLISION

BACKGROUND OF THE INVENTION

1. Field of the Invention

The present invention relates to a method and system for predicting collision which is adapted for use in a driver or occupant protecting device, such as, an air bag or a seat belt employed in a vehicle, particularly in automobiles.

2. Description of the Prior Art

In the past, devices have been constructed employing only Doppler wave signals to detect the presence of objects. Systems applying devices of this type to vehicles for prediction of collision have the following disadvantages. While it is possible to measure the approaching speed of a colliding target, it is impossible to determine the distance of the target from the automobile. Thus, there is possibility of misoperation caused by a remote object having no danger of colliding with the automobile, and moreover it is difficult to determine the direction of movement of the object, that is, whether the object is moving toward or away from the automobile.

SUMMARY OF THE INVENTION

It is an object of the present invention to provide a method and system for predicting collision, in which, following the detection of a target body, the frequency of wave signals is changed with time and at least either one of the change of polarity and the degree of change of phase of the wave caused by the reflection from the target body is detected to determine the distance between the target body and the automobile and at least either one of the approaching movement and the leaving movement of the target, whereby the speed, the distance, the direction of movement, the angle of approach and others of the target are detected to effect prediction of collision without causing misoperation of the system.

The present invention thus comprises a method and system for predicting collision which is operable in accordance with a beat wave produced by an interference between a first wave which has been transmitted and reflected from a target body and a second wave, and in which, when the beat wave has a specified phase angle, the frequency of the first wave transmitted to the target body and that of the second wave are changed to measure at least either one of the polarity of the beat wave and the degree of change of phase of the beat wave with respect to the said frequency. Thus, the system according to the present invention has a great advantage in that it is possible to accurately determine the range of a target at a close distance and at least either one of the approaching movement and leaving movement of the target, and consequently, when a target having an extremely large reflection coefficient, e.g., a mirror having a very large reflection coefficient with respect to transmitted waves is at a sufficiently large distance, exact prediction of collision can be made by detecting whether or not the target is at a distance such that collision is certain to happen and also the direction of movement of the target. Further, by additionally utilizing a beat wave occurring when the frequencies of the first and second waves are not changed, more exact prediction of collision can be accomplished. Since such exact prediction of collision prevents a driver protecting device from operating in response to a distance target, it is possible to prevent the protecting device from operating erroneously in response to a target against which collision can be properly avoided by the operation of the steering wheel, the application of brakes or the like, and moreover the driver protecting device such as an air bag is actually operated only under such circumstances where collision is unavoidable by any means, thereby always assuring freedom of drivers or occupants, particularly of a driver of an automobile.

There is another great advantage in that, with the modulation of the first and second waves in the arrangement above described, their frequencies can be changed linearly with time with the result that the distance from an automobile to a target can be detected as a linear function of time, and particularly since what is essential for a driver or occupant protecting device in an automobile is to determine whether a target is farther than a predetermined distance, the range of effective area can be precisely preset by means of a simple level detector. Furthermore, by means of similar changes of the frequencies of the waves, it is possible to easily discriminate an approaching movement of a target from its leaving movement through a time comparison of the polarity of the beat wave, i.e., a comparison of the polarity of a beat wave before and after the frequency modulation.

DESCRIPTION OF THE PREFERRED EMBODIMENT

Figure 1:
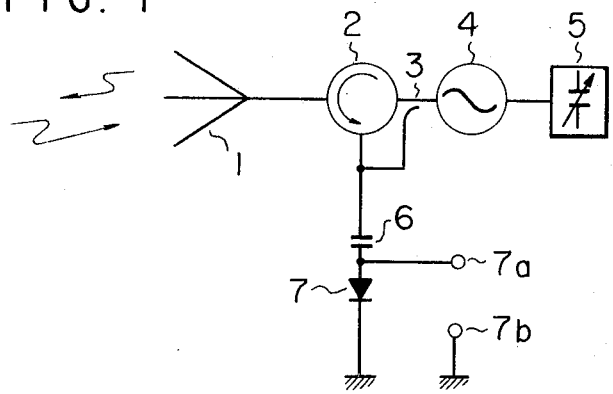
FIG. 1 is an electrical wiring diagram of a microwave circuit employed in an embodiment of an operating system for predicting collision according to the present invention.
Figure 2:
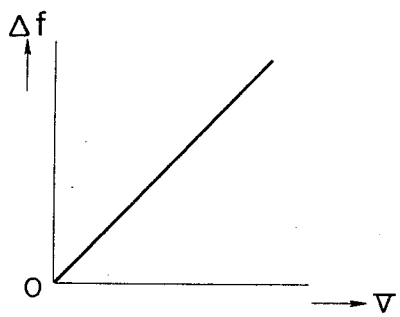
FIG. 2 is a diagram showing the frequency modulation characteristic of the oscillator shown in FIG. 1.

The present invention will now be explained with reference to the illustrated embodiment. Referring first to FIG. 1 illustrating the microwave circuit portion of the embodiment to show the operating principle of the circuit, numeral 1 designates a single antenna used for both transmission and reception of wave signals, 2 a circulator for separating the transmission from reception, 3 a directional coupler for supplying a locally generated output to a mixer diode. Numeral 5 designates a frequency changing element which may be composed of a varactor diode incorporated in the cavity resonator of an oscillator 4. Numeral 6 designates a DC blocking capacitor, 7 a mixer diode, 7a and 7b, output terminals of the mixer diode 7. FIG. 2 is a characteristic diagram showing the relationship between the values of a voltage V applied to the varactor diode 5 and the values of frequency change $\Delta f$ of wave output of the oscillator 4.

The microwave circuit portion described above operates as follows. When the oscillator 4 first generates its wave output, the output is transmitted to the outside from the antenna 1 through the circulator 2. A reflected wave of the wave output which has encountered and been reflected from a target body is mixed and detected in the mixer diode 7 through the circulator 2 and the capacitor 6. In this case, a portion of the generated output of the oscillator 4 is supplied as a local output to the mixer diode 7 by way of the coupler 3. Consequently, a doppler output due to a beat resulting from the interference between the local output and the reflected wave, is taken out as an output of the mixer diode 7. On the other hand, if the oscillation frequency of the oscillator 4 is changed by a voltage applied to the varactor diode 5, even when a target body is stationary, a time delay between the transmitted wave and the reflected wave causes a phase difference (a beat) between the local output and the reflected wave and thus the process of mixing and detection is effected. Now consider the case in which the frequency change $\Delta f$ is linear with the time $t$, then we find Local output voltage $e_1 = a \sin(\omega_0 + \Delta\omega \Delta t)t$ Reflected wave voltage $e_2 = b \sin \omega_0 (t - \Delta t)$ where $\omega_0$ = angular velocity of transmission wave at time $t = 0$ $\Delta\omega$ = slope of constant angular velocity change with frequency modulation $\Delta t$ = interval between transmission of wave and reception of reflected wave Assuming that the mixer diode 7 has a square-low detection characteristic, a detected output voltage e is given as $$e = ma\ b \cos(2\Delta\omega \times t + 2\omega_0 x)/C$$

(1)

where $a$ and $b$ = amplitudes of local output and reflected wave, respectively $X$ = distance to a target body $m$ = mixer efficiency $C$ = velocity of light This, however, represents the case where the deduction was possible with respect to low frequency components only. Now considering the case where no frequency modulation is effected, the first term of the cosine member of the above equation (1) is eliminated, thus giving $$e = ma\ b \cos(2\omega_0 X/C)$$

If the speed of the target is V and its distance at the time $t = 0$ is $X_0$, then we obtain $$e = ma\ b \cos\{2\omega_0/C\ (X_0 - Vt)\} = ma\ b \cos\{4\pi(X_0 - Vt)/\lambda_0\}$$

(2)

where $\lambda_0$ = wavelength corresponding to angular velocity $\omega_0$

In other words, when no frequency modulation is effected, the doppler frequency is given as $$fd = 2V/\lambda_0 = 2Vt_0/C.$$

With the equation (1), when $2\omega_0 X/C = (2n + 1)/2$ (where n is an integer and the same applies hereinafter), the second term in the parenthesized portion of the cosine member becomes $2n + 1/2\ \pi$. This condition appears for each value of X of $\lambda_0/4$ In this situation, if a frequency modulation is effected so that the frequency is caused to change at a rate exceedingly greater than the rate of change $2\omega_0 X/C$, since the change of the second term in the parenthesized portion of the cosine member can be disregarded, we obtain $$e = ma\ b \cos(2\Delta\omega Xt/C + 2n + 1/2\ \pi)$$

$$e = \pm a\ b \sin 2\Delta\omega Xt/C$$

(3)

From the equation (3), the period T is given as $$T = \pi C/\Delta\omega\ X$$

(4)

In other words, the period T is inversely proportional to the distance to a target body. Accordingly, the foregoing discussion may be summarized as follows. A very simple relation holds that if a frequency modulation having an angular velocity sufficiently greater than a doppler frequency is performed, the distance to a target body is proportional to the reciprocal of the period of an output which is obtained by mixing and detecting a reflected wave of a transmitted wave signal with frequency modulation. In a practical driver protecting device, e.g., an air bag, it will be sufficient if the detection is performed to determine whether the distance X is less than several meters or greater and therefore the required operation system for predicting collision can be constructed by employing simple comparators as will be described later.

On the other hand, the direction of movement of a target body can be determined by performing a frequency modulation at the instant when the polarity of a doppler signal with no frequency modulation changes from negative to positive. While the doppler signal with no frequency modulation can be obtained from the above equation (2), if a reference point on the time base is taken at a point $X_0$ at which the polarity of the mixer output with no frequency modulation changes from negative to positive, then we obtain $$e = ma\ b \cos\{2\omega_0\ (X_0 - Vt)/C\}$$

(2)

and at the time $t = 0$ $$e = ma\ b \cos 2\omega_0 X_0 \ /c$$

Assuming now the value of $V > 0$, since the bracketed portion of the equation 2 indicates that the angle decreases with the time $t$, that point where the polarity changes from positive to negative with increase in the time t can be given as $$2\omega_0 X_0 /C = (4n + 1)\pi/2$$

Upon substituting this value into the equation (1), we obtain $$e = ma\ b \cos \{2\Delta\omega X_0 t/C + (4n + 1)\pi/2\} = -a\ b \sin 2\Delta\omega X_0 t/C$$

(5)

Next, consider the case where there is a condition $V < 0$. Since in the equation (2) the angle increases with increase in the time $t$, that point where the polarity reversal from negative to positive occurs with increase in the time $t$, is given $$2\omega_0 X_0/C = 4n - 1/2$$

Upon substituting this value into the equation (1), we obtain $$e = m\ a\ b \sin 2\Delta\omega X_0 t/C$$

(6)

In other words, as will be seen from the equations (5) and (6), if a frequency modulation is performed at a specified angle of a doppler signal obtained with no frequency modulation, the polarity of the resultant detected output of a mixer differs depending on the direction of movement of a target and therefore it is possible to determine whether the target is moving away or toward an automobile.

While the description has been made for the case where the frequency, upon frequency modulation, increases linearly with increase in the time $t$, it is needless to say that if the situation is reversed so that the frequency decreases at a constant rate with time, the same principle still applies excepting that the waveforms for an approaching target are replaced with those for a leaving target and vice versa.

Figure 3:
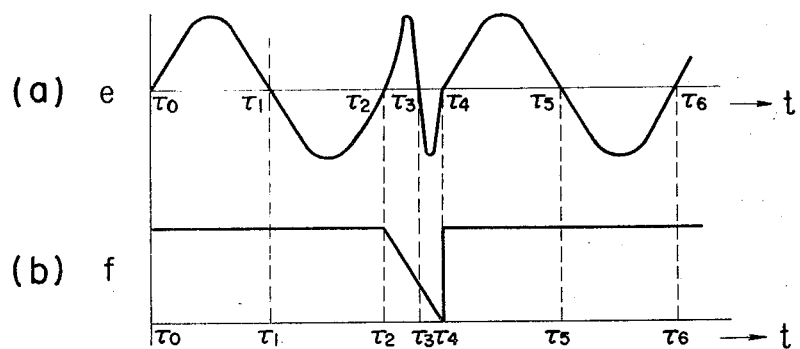
FIGS. 3 and 4 are diagrams showing the characteristics of detected output voltages when frequency modulation is effected.
Figure 4:
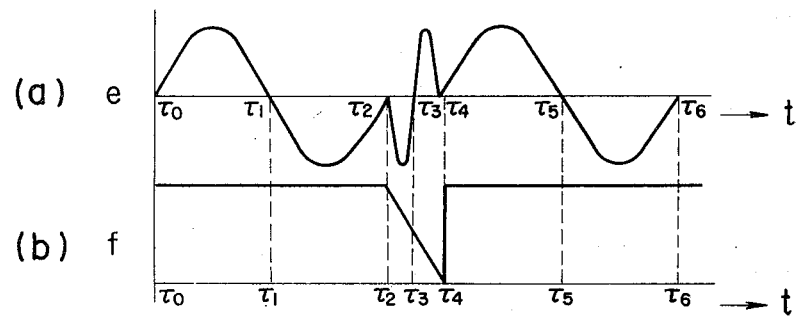

In the discussion to follow, explanation will be made for the case in which for an approaching target the detected waveform due to a frequency modulation has the same polarity as that of a doppler waveform with no frequency modulation. FIGS. 3 and 4 represent such an instance. FIG. 3 relates to an approaching target, while FIG. 4 relates to a leaving target. FIG. 3(a) shows the waveform of detected output voltage $e$ and FIG. 3(b) shows changes in the frequency $f$ with the time $t$. As will be seen from FIG. 3(b), no frequency modulation is effected during the time $t = \tau_0$ to $\tau_2$. Consequently, an ordinary doppler output is obtained as a detected output. This waveform is obtained according to the equation (2). When the time $t = \tau_2$, the polarity of the doppler signal changes from negative to positive. At this time, the voltage applied to the varactor diode 5 begins to change so that the oscillation frequency of the oscillator 4 changes linearly with time as shown in FIG. 3(b). Consequently, as previously mentioned, the oscillation frequency changes during the time $t = \tau_2$ to $\tau_4$ to continue the detected waveform of the doppler signal with no modulation. If the frequency with no modulation is restored upon completion of one period of the waveform with modulation, the doppler signal with no modulation continues to be produced again after the time $t = \tau_4$.

While, in FIG. 3, the time period $\tau_2$ to $\tau_4$ is shown on a larger scale for purposes of clarification, depending on the method of frequency modulation, this period can be made sufficiently larger than that of doppler signal so that the phase difference of the doppler signal during the time period $\tau_2$ to $\tau_4$ is very small and thus the waveform seemingly appears continuously as shown in FIG. 3.

The foregoing explanation is entirely true for the case shown in FIG. 4. In this case, however, since the target body is leaving, if a frequency modulation is effected at a point where the polarity of the doppler signal changes from negative to positive as previously explained, a polarity reversal occurs for the doppler signal with no modulation and the doppler signal with modulation as shown in FIG. 4(a). In this way, it is possible to determine whether the target is approaching or leaving.

Further, since the time period $\tau_2$ to $\tau_4$ or the period due to the frequency modulation is inversely proportional to the distance to a target body as previously explained, the slope of the sawtooth wave illustrated in FIGS. 3(b) and 4(b), respectively, may be fixed so that by measuring, for example, the extent of the foremost end of the sawtooth wave, the distance to the target can be determined.

In a driver protecting device, determination of whether the distance to a target is greater or smaller than a predetermined value is sufficient and therefore whether or not the target is within a critical range can be determined by means of a comparator which compares the top level of a sawtooth wave with a predetermined level.

While, in the above description, the method has been explained in which the frequency is linearly changed, e.g., a voltage is applied linearly with time to the varactor diode 5, the frequency needs not necessarily be changed linearly with time. To obtain the waveform appearing during the time period $\tau_2$ to $\tau_4$, any method of frequency modulation can be used to produce the same waveform if only the ordinate represents the detected output and the abscissa represents the frequency. However, a practical system can be more easily realized if frequency change is linear with time and therefore this method of determining the distance and direction of movement of a target will be explained in detail hereunder.

Figure 5:
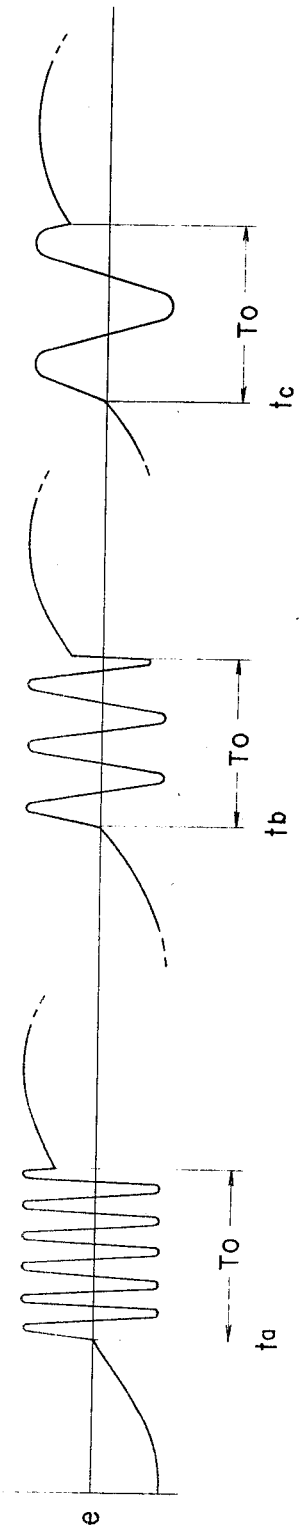
FIG. 5 is a diagram showing the characteristics of detected output voltages when the modulation time is made constant.
Figure 6:
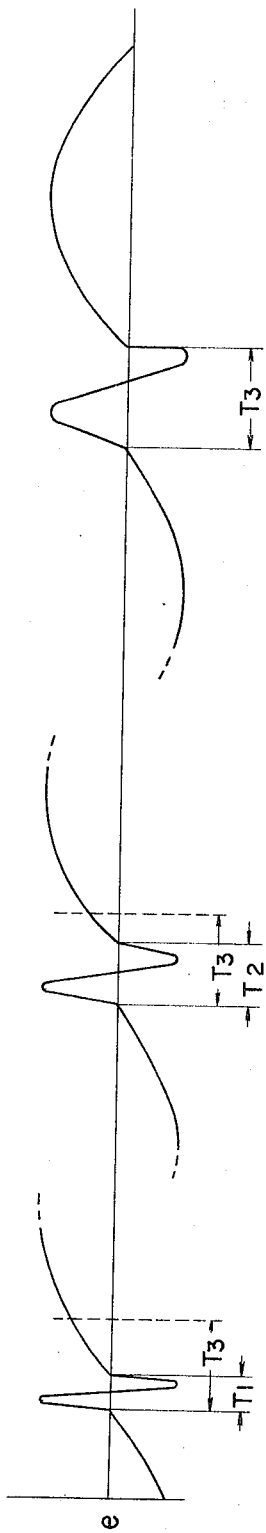
FIG. 6 is a diagram showing the characteristics of detected output voltages when a modulated beat is formed in a period.

FIG. 5 illustrates the case where a target is approaching an automobile and in this state the frequency is changed linearly for a predetermined period of time, and FIG. 6 illustrates the waveform produced at the output of the mixer diode 7 when the frequency is changed during a time period corresponding to one period or a predetermined time, which is shorter. Both FIGS. 5 and 6 illustrate doppler signals with no modulation before and after the performance of frequency modulation. In FIG. 5, there is illustrated the case where the frequency is changed at a constant rate starting at a point when the polarity of detected output voltage e of the mixer diode 7 with no modulation changes from negative to positive and the modulation is maintained during a predetermined time period $T_0$. Since the target is approaching the automobile every moment, the number of cycles in the period $T_0$ which was more than five cycles at the time $t = t_a$ decreases to three cycles at the time $t = t_b$ and to 1.5 cycles at $t = t_c$. Accordingly, in the method of performing frequency modulation for a predetermined time period, the approximate distance to a target can be measured by counting the number of cycles in the time period $T_0$. Moreover, by detecting changes in the number of cycles due to the frequency modulation performed intermittently, it is possible to determine whether a target is approaching or leaving. In other words, by means of a circuit construction in which a sawtooth wave is controlled by a pulse generator that produces pulses for a predetermined time period as will be explained later and the number of pulses produced in the interval is counted, it can be readily arranged so that it is possible to measure the distance to a target and moreover whether the target is approaching or leaving can be determined by storing the number of pulses counted in a memory and then comparing it with the number of pulses counted the next time.

Further, FIG. 6 illustrates a waveform obtained when control is effected by a period of time which is shorter, i.e., either when a detected output voltage e due to a frequency modulation completes one period after the frequency modulation is effected at a point where the polarity of a doppler signal with no modulation changes from negative to positive or when a predetermined time $T_3$ expires after the initiation of a frequency modulation. As with the previously mentioned method, this method also ensures easy measurement of the distance to a target as well as determination of whether the target is approaching or leaving by the measurement of the period T and changes in this period.

Figure 7A:
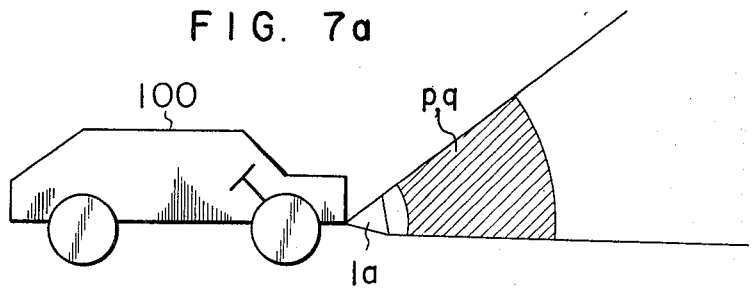
FIGS. 7a and 7b are respectively a side view and a plan view of an automobile showing the effective areas of two antennas.
Figure 7B:
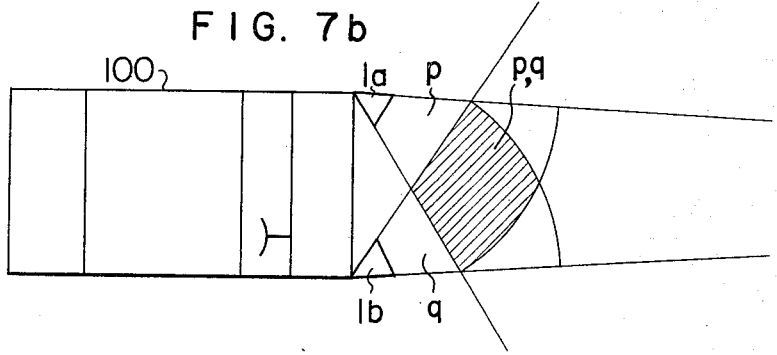

Next, an embodiment will be explained in which the modulation method shown in FIG. 6 and the previously mentioned method of detecting a target by comparing the polarity of the detected output after modulation with that before modulation, are applied to a driver protecting device. FIGS. 7(a) and 7(b) illustrate the arrangement of wave transmitting antennas and their effective areas. For the purpose of the discussion to follow, assume that waves used consist of electromagnetic waves of microwave frequencies. In FIGS. 7(a) and 7(b), numeral 100 designates an automobile equipped with a driver protecting device, and 1a and 1b designate antennas which are arranged on the front sides of the automobile for transmitting and receiving radio waves. Symbol p designates the effective area of the antenna 1a, and q designates the effective area of the antenna 1b. Since ultimately prediction of collision is possible in those areas where the antennas 1a and 1b can detect signals in their respective effective areas, the device is operable only in the hatched portion, i.e., an area designated at p, q. This is effective as a method of eliminating unnecessary detection in the front and the sides of the automobile. As will be seen from FIG. 7(a), the antennas 1a and 1b are slightly turned upwardly so that no reflected waves from the road surface may be picked up, while, as will be seen from FIG. 7(b), the antennas 1a and 1b are both turned inwardly to provide suitable effective areas.

Figure 8:
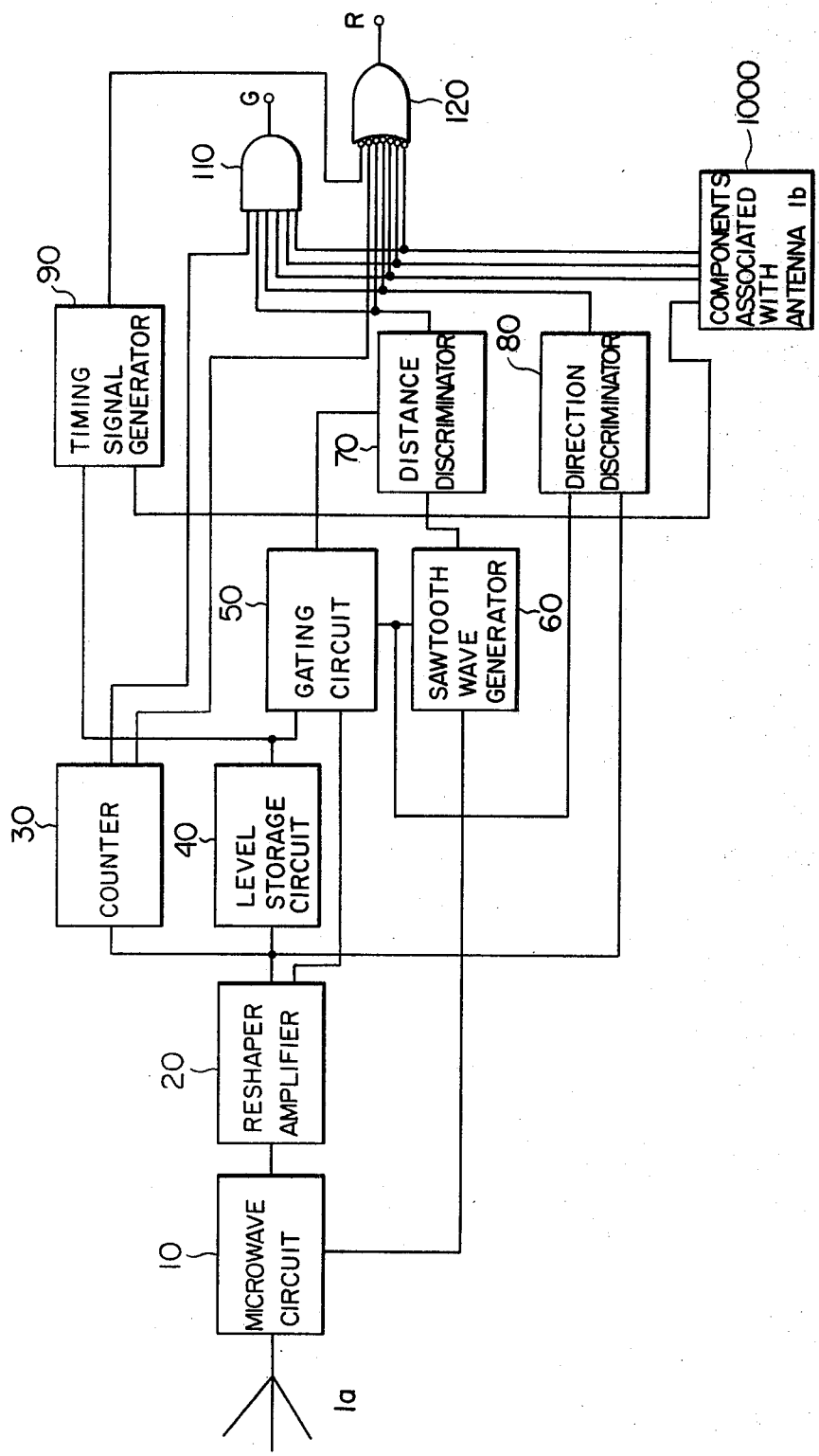
FIG. 8 is a block diagram showing the general construction of the whole system according to the present invention.

Referring now to FIG. 8, a block diagram showing an embodiment of a system according to the present invention will be explained. In the figure, numeral 1a designates the antenna 1a shown in FIG. 7. In the discussion to follow, only the component parts associated with the antenna 1a will be explained, since the information processing operation associated with the antenna 1b is the same with that associated with the antenna 1a. However, those components which are common to both antennas will also be explained. Numeral 10 designates a microwave circuit including a mixer-detector circuit. Numeral 20 designates a reshaper-amplifier circuit for performing wave reshaping and amplification, 30 a counter, 40 a level storage circuit, 50 a gating circuit for frequency modulation, 60 a sawtooth wave generator, 70 a distance discriminating circuit, 80 a direction discriminating circuit for determining the direction of movement of a target, 90 a timing signal generating circuit, 110 an AND circuit which ultimately generates an actuation signal for operating a driver protecting device, e.g., an air bag, 120 an OR circuit for detecting that there is no danger of collision and which produces a reset signal R for resetting all the memory contents of the system. Numeral 1000 designates the similar circuit elements associated with the antenna 1b, and the circuit elements designated by the numerals 90, 110 and 120 are elements common to the antennas 1a and 1b and thus they are not included in the circuits designated generally as 1000.

The operation of this embodiment is as follows. Microwaves generated by the microwave circuit 10 are transmitted toward the front of the automobile. This is the same with the antenna 1b and thus a target in the effective area p, q is simultaneously detected by the antennas 1a and 1b. Since the information processing operation relating to the antenna 1a is the same with that relating to the antenna 1b, the following explanation will be made only with respect to the antenna 1a. A microwave which has been transmitted from the antenna 1a and encountered and returned from a target is detected in the microwave circuit 10 and the detected signal is then amplified and reshaped in the reshaper-amplifier circuit 20. The level storage circuit 40 stores from this signal that a predetermined level is exceeded. Thereafter, the processing of information is initiated according to the memory content of the level storage circuit 40. When this stored level is triggered, the gating circuit 40 is conditioned for operation and thus the gating circuit 50 is caused by the output of the reshaper-amplifier circuit 20 to produce predetermined gating pulse for a predetermined period. The gating pulse is then received by the sawtooth wave generator 60 which produces a sawtooth wave for the duration of the gating pulse. This sawtooth wave is supplied to a terminal for changing the frequency of the microwave circuit 10 and thus the frequency of the microwaves varies in accordance with the sawtooth wave. When this occurs, the detected output of the microwave abruptly changes with the frequency change of the microwave. In other words, the frequency change is performed in such a manner that a waveform is obtained whose frequency changes more rapidly than that of a doppler signal due to a target with no modulation. The gating pulse from the gating circuit 50 is terminated when either one of two conditions is satisfied, i.e., either when the detected waveform with modulation attains one period or when the output of the distance discriminating circuit 70 attains a predetermined level. The distance discriminating circuit 70 is designed to detect the level of the sawtooth wave and the voltage value of the sawtooth wave at any time corresponds to the frequency. Therefore, as previously explained, if the level of the sawtooth wave having this predetermined building-up attains the predetermined level before the detected output completes one period, it means that the target is at a distance which is very close to the automobile and it is thus detected by the system that the target is within a dangerous range.

Next, the direction discriminating circuit 80 determines whether, during the period of the above-mentioned gating pulse, the polarity of the doppler signal with no modulation corresponds with that of the doppler signal with modulation. This series of action is completed during the frequency modulation process and the aforesaid determination of distance and polarity is also terminated upon the termination of the gating pulse, thereby restoring the condition with no modulation. Following this, the counter 30 starts counting the doppler signals. On the other hand, when the memory content of the level storage circuit 40 is triggered, the timing signal generating circuit 90 generates a timing signal for a predetermined period of time. This time period is for the purpose of setting the minimum speed of the target and unless the count of the counter 30 attains a predetermined number during this time period the situation will not be considered dangerous.

In the process of these operating steps, the speed, angle of approach, direction and distance are all measured and the AND circuit 110 produces a logical product of these measurements to determine whether the driver protecting device should be operated.

Further, the resetting is effected by the signal which is reversed in polarity to the inputs to the AND circuit 110, thereby starting the operation again from the beginning. In practice, however, the OR circuit 120 detects whether an actuation signal G is produced at the output terminal of the AND circuit 110 during the discriminating period of the timing signal generated by the timing signal generating circuit 90. Thus, if no actuation signal G is produced during this predetermined period, all the circuits are reset thereby starting a further computational operation again.

Figure 9:
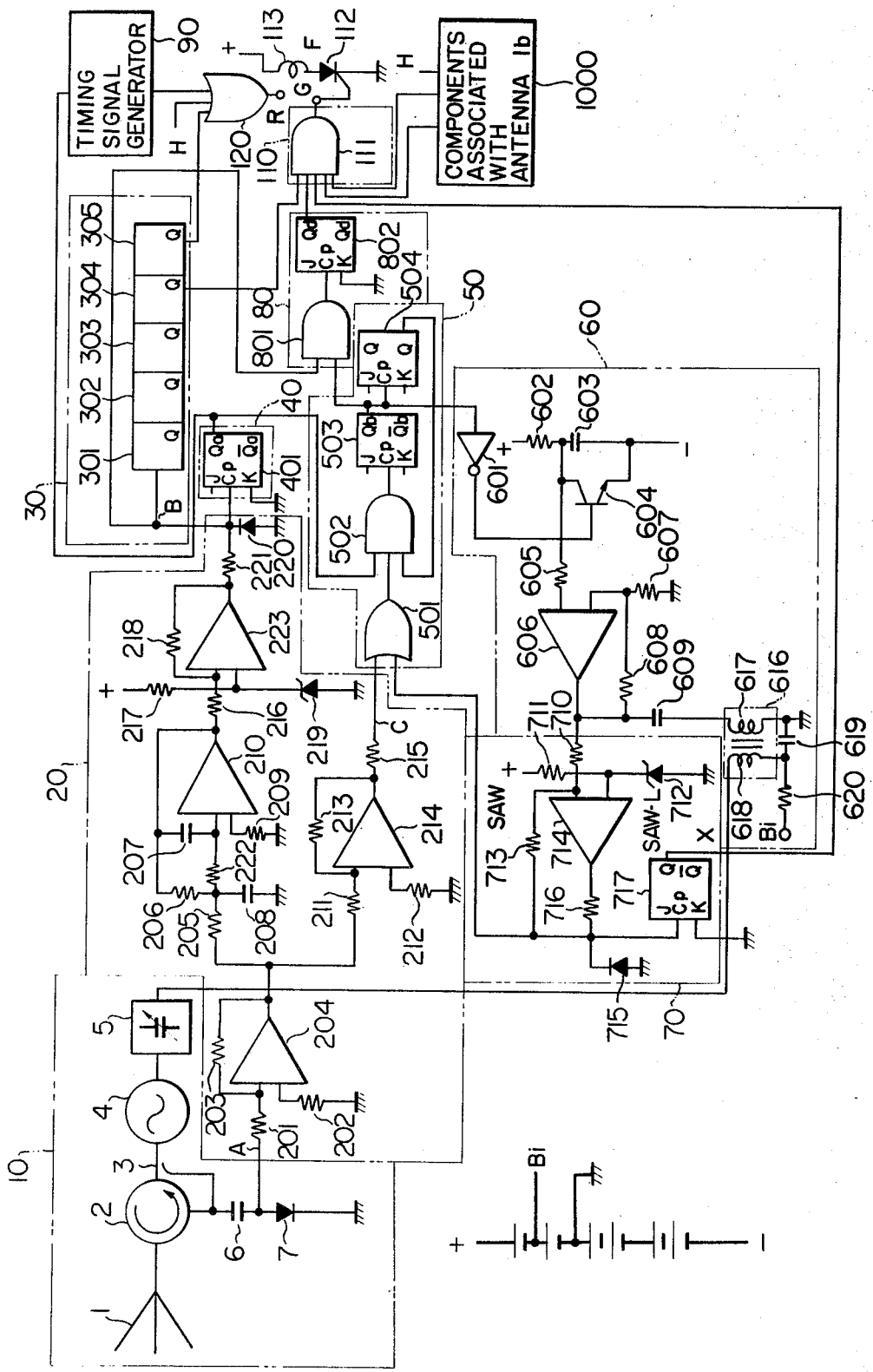
FIG. 9 is a circuit diagram showing the electric circuits of the block diagram shown in FIG. 8.

FIG. 9 is a circuit diagram of the block diagram shown in FIG. 8. Among the circuit elements shown in FIG. 9, those which have been described so far will not be explained, and the explanation will be made with respect to only one of the antennas 1a and 1b, since the explanation with respect to each of the antennas 1a and 1b is the same and thus symbols a and b will not particularly be used. In the reshaper-amplifier circuit 20, numeral 201 designates an amplifier input resistor, 202 a zero biasing input resistor, 203 a feedback resistor, 204 a differential amplifier, with the elements 201 to 204 constituting a signal amplifier. Resistors 205, 206, 222 and 209, capacitors 207 and 208 and a differential amplifier 210 constitute an active low-pass filter. Numeral 216 designates an input resistor, 217 a biasing resistor, 218 a feedback resistor, 223 a differential amplifier, 219 a level setting Zener diode, 220 a diode for blocking a negative-going output, 221 an output resistor, with the elements 216 to 221 constituting an input signal level detector. The reshaper-amplifier circuit 20 is composed of this level detector, signal amplifier and low-pass filter. Numeral 211 designates an input resistor, 212 a zero bias setting resistor, 213 a feedback resistor, 214 a differential amplifier, 215 an output resistor of the amplifier 214, with the elements 211 to 215 constituting a reshaping circuit wherein the polarity is opposite to that in the level detector in the reshaper-amplifier circuit 20 and wherein the comparison voltage is at a zero level. Numerals 301 to 305 designate flip-flops, for example, which constitute the respective bits of the counter 30 and which are connected in series to operate as a binary counter, and Q designates an output terminal for each bit. Numeral 401 designates a flip-flop constituting the level storage circuit 40 which consists of a JK flip-flop. The storage circuit 40 may be composed of an OR which receives signals from the output terminals Q of the flip-flops constituting the respective bits of the counter 30. In the gating circuit 50, numeral 501 designates an OR circuit which operates by receiving the output of the reshaping circuit in the reshaper-amplifier circuit 20 and the output of the distance discriminating circuit 70 which will be explained later, 502 an AND circuit which operates by receiving the output of the JK flip-flop 401 constituting the storage circuit 40, the output of the OR circuit 501 and the output of a flip-flop in the succeeding stage, 503 a flip-flop which operates upon receipt of the output of the AND circuit 502, 504 a flip-flop which operates upon receipt of the output of the flip-flop 503, with the flip-flops 503 and 504 constituting a counter. In the sawtooth wave generator 60 which will be explained later, the gating signal for producing a sawtooth wave is derived from the output of the flip-flop 503.

The gating circuit 50 is composed of the elements designated by the numerals 501 through 504. In the sawtooth wave generator 60, numeral 601 designates an inverter, 602 a charging resistor, 603 a storage capacitor, 604 a switching transistor for controlling the initiation and termination of the production of sawtooth wave, 605 an input resistor, 606 a non-inversion amplifier, 607 a zero bias imput resistor, 608 a feedback resistor, the production of sawtooth wave being accomplished by the elements designated by the numerals 601 through 608. Numeral 609 designates a coupling capacitor, 616 a step-up transformer, 617 a transformer primary winding, 618 a transformer secondary winding, 619 a decoupling capacitor, 620 a biasing resistor for the varactor diode 5, Bi a biasing terminal. The sawtooth wave generator 60 is composed of the elements designated by the numerals 601 through 619. In the distance discriminating circuit 70, numeral 710 designates an input resistor, 711 and 712, a level setting resistor and Zener diode, 713 a feedback resistor, 714 a differential amplifier, 715 a negative-going output blocking diode, 716 an output resistor, 717 a flip-flop for storing information that the distance to a target has become smaller than a predetermined value, with the elements designated by the numerals 710 through 717 constituting the distance discriminating circuit 70 for detecting the sawtooth wave level to detect the distance to a target. In the direction discriminating circuit 80, an AND circuit 801 discriminates the approaching movement from the leaving movement of a target, and numeral 802 designates a storage flip-flop. Although previously explained, numeral 110 designates the AND circuit for producing an actuation signal G upon prediction of collision, 120 the resetting OR circuit for resetting all the memory contents of the system, 112 a silicon controlled rectifier (hereinafter referred to as an SCR) operated by the actuation signal G, 113 a driver protecting device actuator, such as, a filament or solenoid for igniting an explosion which opens a valve provided between an air bag and a compressed air tank to direct air in the tank to the air bag to inflate it.

Figure 10:
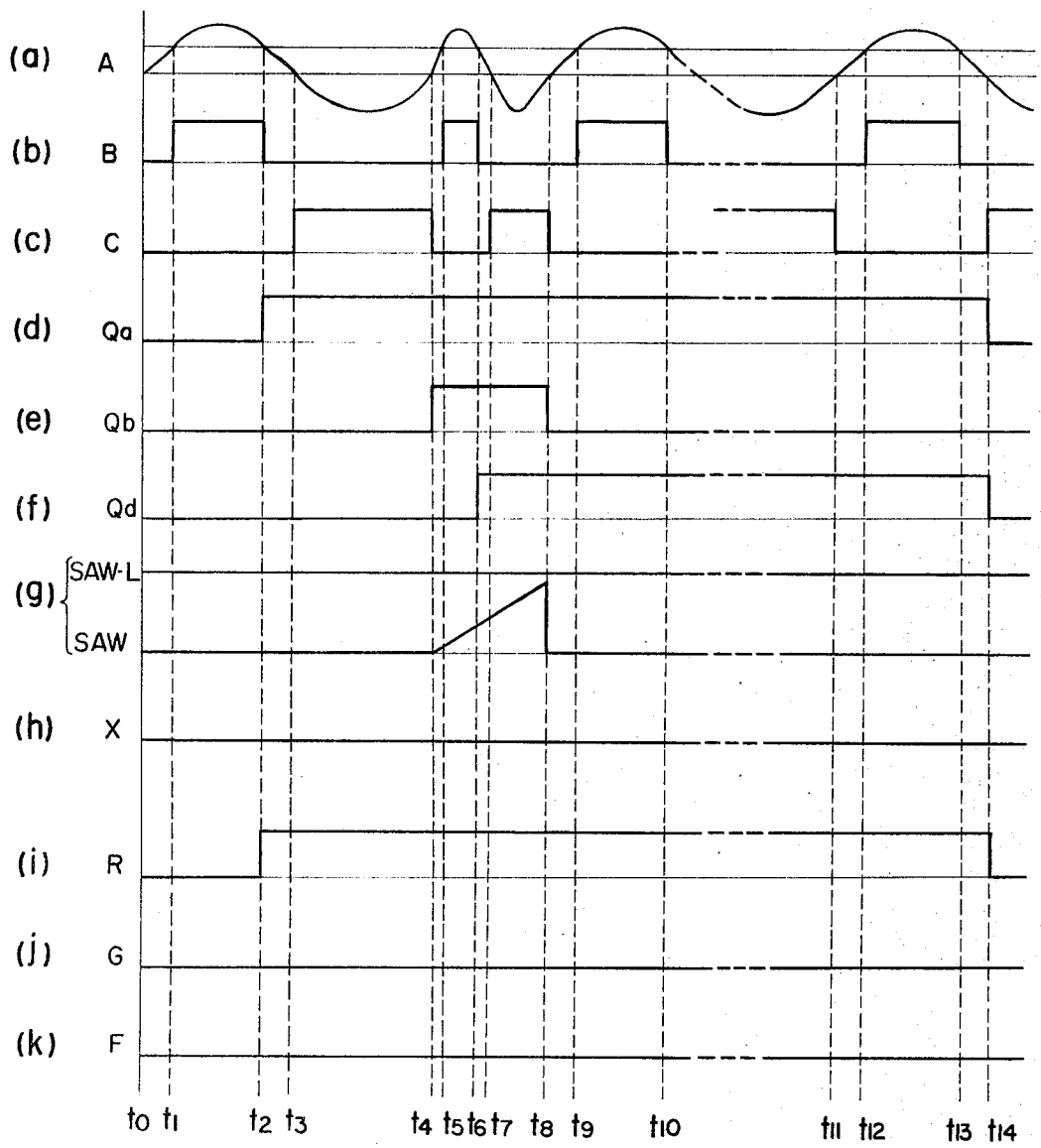
FIGS. 10, 11 and 12 are diagrams showing the signal waveforms at various portions of the electric circuits shown in FIG. 9, which are useful for explaining the operation thereof.

With the construction described above, the operation of the embodiment will now be explained with reference to FIGS. 10 through 12 wherein symbol A designates the output of the mixer diode 7, B the input signal to the level storage circuit 40 or the counter 30, C the output of the level detector in the reshaper-amplifier circuit 20, Q$a$ the output of the level storage circuit 40, Q$b$ the output of the first bit flip-flop of the counter in the gating circuit 50, Q$d$ the output of the direction discriminating circuit 80, SA$\omega$.L the level of the sawtooth wave generated by the sawtooth wave generator 60, SA$\omega$ the sawtooth wave signal, X the output of the distance discriminating circuit 70, R the reset signal, G the actuating signal for the driver protecting device actuator, F the anode waveform of the SCR 112. The explanation will be made in sequence of time referring first to FIG. 10. After the time $t = t_0$, a doppler signal appears at the output of the mixer diode 7 as a detected output waveform A sh shown in FIG. 10($a$). At this time, only a fixed bias is being applied to the varactor diode 5 and therefore the output of the oscillator 4 is of a constant frequency, i.e., there is no modulation. When the detected output signal A reaches the detecting level of the level detector in the reshaper-amplifier circuit 20 at the time $t = t_1$, the signal B applied to an input terminal CP of the flip-flop 401 of the level storage circuit 40 is inverted as shown in FIG. 10($b$). This inverted signal is maintained until at the time $t = t_2$ when the signal A again drops below the detecting level of the said level detector. When the signal B falls at time $t = t_2$, the output signal Q$a$ of the level storage circuit 40 is inverted as shown in FIG. 10($d$) and simultaneously the counter 30 counts a 1. Also starting at this time, the output of the timing signal generating circuit 90, i.e., the reset signal R is changed to the H state shown in FIG. 10($i$) as a signal for releasing the reset condition and thereafter the reset condition is released until a predetermined time is attained or the fifth bit flip-flop in the counter 30 is set or the fifth bit flip-flop in another counter associated with the other antenna 1b is set causing the signal to change to the H state. Then, at the time $t = t_3$, the output signal C of the reshaping circuit in the reshaper-amplifier circuit 20 for detecting the zero level is inverted as shown in FIG. 10($c$). At a still later time $t = t_4$, the polarity of the input signal A changes again and at this time a frequency modulation is performed, thereby causing the gating circuit 50 to produce a gating signal Q$b$ shown in FIG. 10($e$) and thus opening the gate. In this case, since the flip-flop 504 of the gating circuit 50 is in the reset state, i.e., $Q = L$ and $\bar{Q} = H$ and Q$a = H$ in the flip-flop 401 constituting the storage circuit 40, the waveform of the signal C changes its state from the L to H and to L again during the time period $t_3$ to $t_4$, thereby causing the output Q$b$ of the flip-flop 503 in the gating circuit 50 to change to the H state. When this occurs, an H signal at the output Q$b$ causes, through the inverter 601, the base of the transistor 604 to change to the L state and thus renders the transistor 604 nonconductive. Consequently, the charge supplied through the resistor 602 is stored in the capacitor 603. At this time, the terminal voltage (sawtooth wave voltage) of the capacitor 603 increases as shown in FIG. 10($g$) with a predetermined time constant determined by the resistor 602 and the capacitor 603. This increased voltage is then stepped up through the differential amplifier 606 and the step-up transformer 616 and applied to the varactor diode 5. In the case of this embodiment, the aforesaid predetermined time constant is selected considerably shorter than the recurrence period of the doppler signal with no modulation. The polarity of the output voltage of the transistor 616 is selected so that it becomes the same with the polarity of the doppler signal with no modulation when a target is approaching. Consequently, the voltage applied to the varactor diode 5 through the secondary winding 618 of the transformer 616 causes the oscillator 4 to change its oscillation frequency. Assuming now that the target is approaching, after the time $t = t_4$, the detected output signal A takes a waveform of the same polarity as that shown before the time $t = t_4$ as shown in FIG. 10($a$). At the time $t = t_5$, the detected output signal A again exceeds the detecting level of the level detector in the reshaper-amplifier 20 and it again drops below the detecting level at the time $t = t_6$. During this time period, the signal B changes its state from L to H and to L again. In this period, the gating signal Q$b$ remains in the H state and thus the AND element 801 of the direction discriminating circuit 80 produces at its output the same waveform as the signal B. Consequently, the output signal Q$d$ of the direction discriminating circuit 80 changes to the H level as shown in FIG. 10($f$). This indicates that the target is approaching. In other words, as will be explained later, if the target is leaving, the output signal Q$d$ remains at the L level. During a time period $t_7$ to $t_8$, the signal C again changes its state from L to H and to L again and thus the signal Q$b$ changes from the H to the L state at the time $t = t_8$. Consequently the transistor 604 is rendered conductive so that the gating signal Q$b$ terminates and the saw-tooth wave SA$\omega$ returns to its initial level, thereby restoring the no-modulation condition. The change of the state of the signal B from L to H and to L again during the time period $t_5$ to $t_6$ causes the counter 30 to count another 1. Since the time period $t_4$ to $t_8$ is short, at the time $t_8$ the waveform of the doppler signal with no modulation extends as if it were still continuous during the time $t_4$ to $t_8$. Also, since the detected output with modulation completes one period during the time $t = t_4$ to $t_8$, the sawtooth wave level SA$\omega$ appearing through the resistor 710 at one input terminal of the differential amplifier 714 in the distance discriminating circuit 70 does not reach the level SA$\omega$·L of the sawtooth wave at the other input terminal. Consequently, the output X of the flip-flop 717 is not inverted and thus the flip-flop 717 is not caused to be set. As a result, even the output of the flip-flop 304 in the counter 30 or the corresponding output Q of another counter associated with the other antenna and the signal Q$d$ are set on at the time $t = t_{13}$, no actuation signal G will be generated. When, after the expiration of a predetermined time, the output signal of the timing signal generating circuit 90 is inverted at the time $t = t_{14}$, the reset signal R of the OR circuit 120 changes to L and thus all the circuits included in the system are reset, thereby causing the operation to be started anew. This reset signal will be generated when any one of the following conditions is satisfied:

1. After the expiration of a predetermined time, the output signal of the timing signal generator 90 is inverted.
2. The fifth bit flip-flop of the counter 30 is set, i.e., there is the condition $Q = H$.

3. The fifth bit flip-flop of the counter associated with another antenna is set.

Furthermore, it is unnecessary to lead the input signals of the distance discriminating circuit 70 and the direction discriminating circuit 80 to the input terminal of the OR circuit 120 in FIG. 8 and to invert the input signal of the OR circuit 120. Consequently, the circuit diagram of FIG. 9 showing the electric circuits of the block diagram shown in FIG. 8 is enough to explain the above-described conditions.

The foregoing description of FIG. 10 represents the case where the distance to a target remained greater than a predetermined value and thus no actuation signal G was generated.

Figure 11:
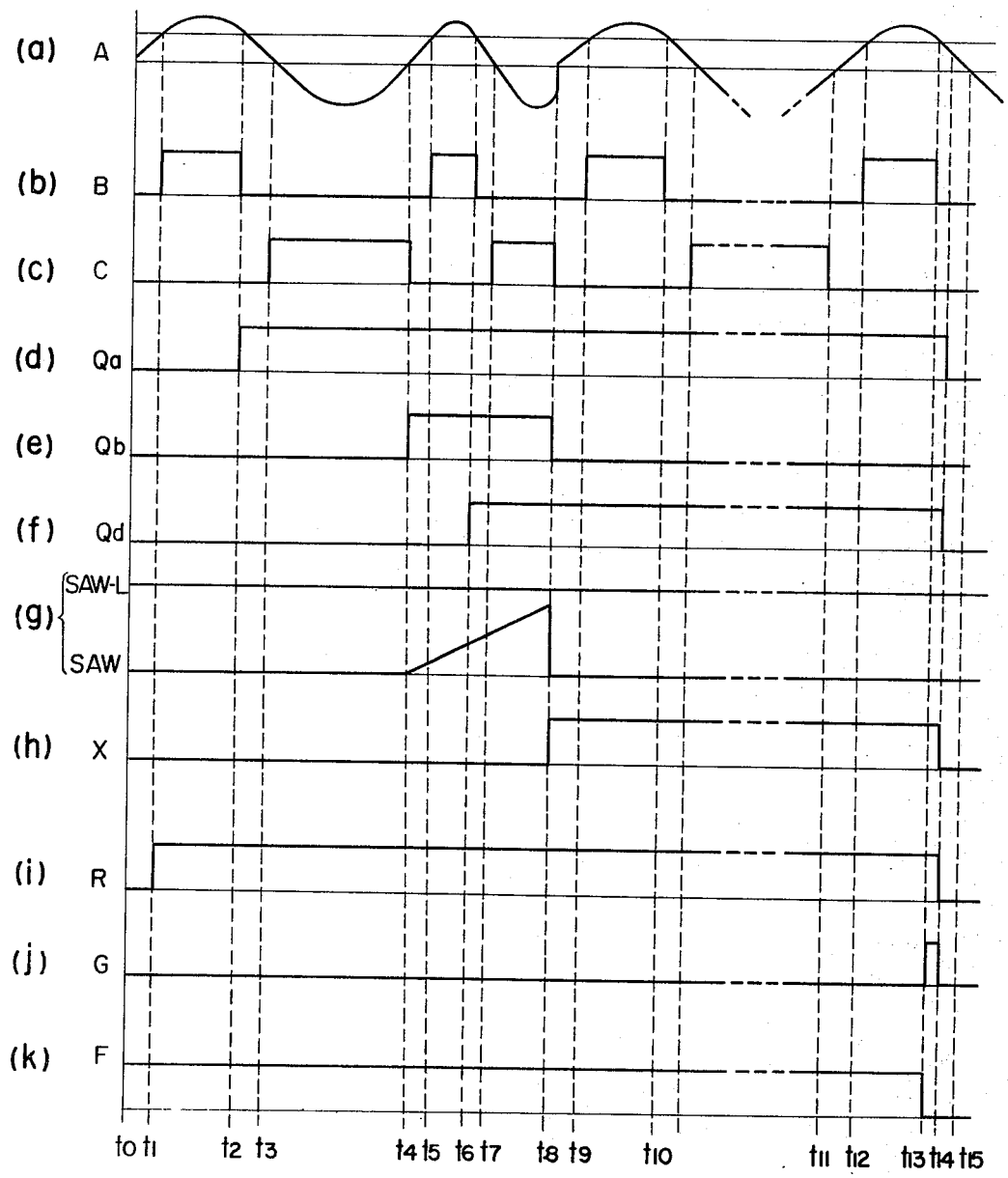

Referring now to FIG. 11, there is illustrated the case where the production of an actuation signal G takes place. In the discussion to follows, only what differs from the case illustrated in FIG. 10 will be explained. At the time $t = t_8$, it becomes that $SA\omega = SA\omega\cdot L$. Consequently, the signal X for determining the distance to a target, shown in FIG. 11(h) and generated at the output terminal Q of the flip-flop 717, changes to H. Then, at the time $t = t_{13}$, the signal at the output terminal Q of the fourth bit flip-flop in the counter 30 changes to H. If, during the same period, the signal at the output terminal Q of the fourth bit flip-flop in the counter for another antenna also changes to H, the signal Qd also changes to H, thereby causing the actuation signal G to change to and remain H from the time $t = t_{13}$ until the inversion of the timing signal at the time $t = t_{14}$. This results in the application of a signal to the gate of the SCR 112 and thus the potential F (FIG. 11(K)) at the anode of the SCR 112 falls at $t = t_{13}$, thereby operating the actuator 113 to actuate the driving protecting device.

Figure 12:
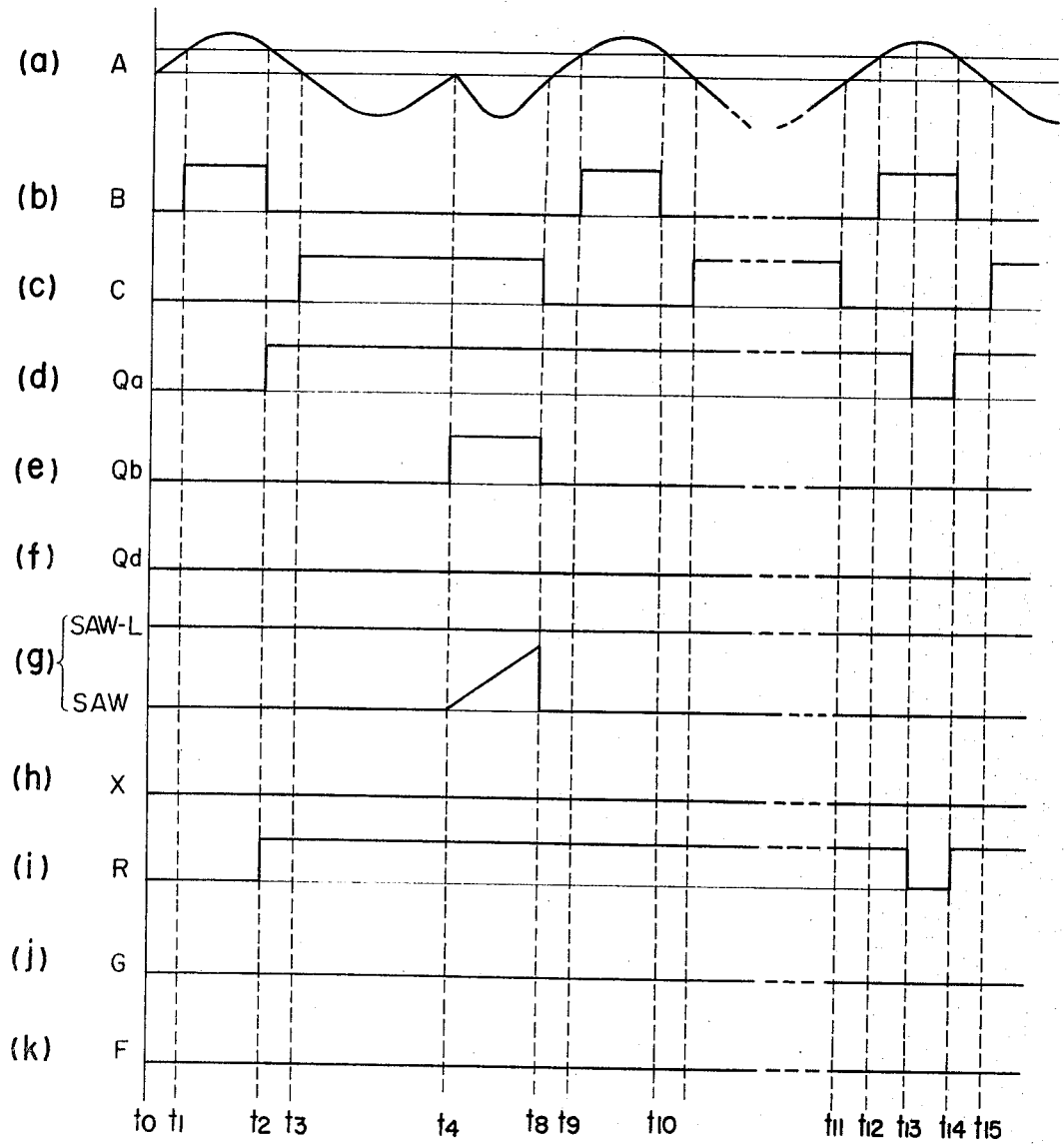

Referring now to FIG. 12, the case of a leaving target will be explained. At the time $t = t_4$, a gating pulse Qb is generated so that the sawtooth wave signal $SA\omega$ rises. At the time $t = t_8$, the signal C falls with the result that the gating signal Qb changes to L at the time $t = t_8$ and thus the gating signal Qb terminates. During this period, the signal B will never assume the state of H and consequently the output signal Qd of the flip-flop 802 for determining whether a target is approaching or leaving will not be changed to H, thereby permitting the required discrimination between approaching and leaving. If for example, the frequency $f_0$ of microwaves is 10 GH$_z$, then $\lambda = 3$ cm, whereas if the amount of frequency change is 50 MHz, then we obtain from the previously mentioned equation (1) that $\Delta\omega t = 2\pi\Delta ft = 2\pi \times 5 \times 10^7$. Thus, if the velocity of light is assumed as $C = 3 \times 10^8$ m/sec, then the distance to a target corresponding to the change of one cycle from the target with frequency modulation is obtained as $X = 3$ m. In this way, when the target is at a distance greater than 3 m, the driver protecting device will not be operated.

On the other hand, the doppler signal with no modulation appears at the rate of one cycle at intervals of $X = 1.5$ cm according to the equation (1). If the target is running at the speed of 72 Km/h, then the doppler signal with no modulation becomes 1.3 KHz. It is thus sufficient, if the system is operated to sweep 0 to 50 MHz during a period of time corresponding to one several tenth of the time required for the aforesaid one cycle, e.g., about 30 $\mu$ sec. Further, the time required to travel 3 m at the speed of 72 Km/h is 150 m sec and this provides a sufficient time for the driver protecting device to operate. And it is evident that this distance can be adjusted as desired by suitably designing the sawtooth wave level.

Figure 13:
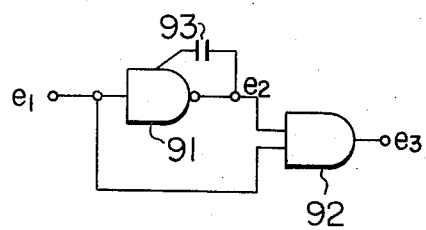
FIG. 13 is an electric wiring diagram of the timing signal generating circuit shown in the block diagram of FIG. 8.
Figure 14:
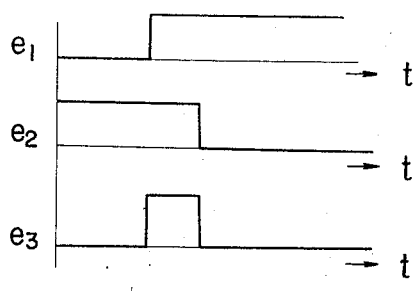
FIG. 14 is a diagram showing the signal waveforms at various portions of the timing signal generating circuit shown in FIG. 13 for explaining the operation thereof.

Returning to FIG. 9, the purpose of the low-pass filter composed of the elements designated by numerals 205 through 210 and 222 is to eliminate the occurrence of misoperation due to an object at a considerably great distance. Referring now to FIG. 13, there is illustrated one form of the timing signal generating circuit 90 and FIG. 14 illustrates a diagram for explaining the operation of the timing signal generating circuit 90. Then, in FIG. 8 both output signals of the level storage circuit 40 and the circuit elements 1000 associated with the antenna 16 are applied to the timing signal generating circuit 90, however, as shown in FIG. 9 only the output signal of the storage circuit 40 may be applied to the timing signal generating circuit 90. In the figures, numeral 91 designates a delayed signal generating NAND element, 93 a capacitor for setting the delay time, 92 a delayed signal generating AND element, $e_1$ the input signal, $e_2$ the output of the NAND element 91, $e_3$ the output, i.e., the timing signal.

While, in the embodiment described above, the system has been operated utilizing the local output from the oscillator 4 as a second wave, it is self-evident that the output of an oscillator provided in addition to the oscillator 4 may be used as the second wave.

We claim:

1. An operating method for predicting collision comprising the steps of:
   transmitting the first wave to a target,
   receiving said first wave reflected by said target, obtaining a second wave of frequency corresponding to the frequency of said first wave,
   causing said second wave to interfere with said reflected wave to produce a first beat wave by Doppler effect,
   changing the frequencies of said first and second waves at the occurance of a specified phase angle of said first beat wave, and
   detecting at least either one of the polarity and the amount of change of phase of a second beat wave which is generated similarly as said first beat wave according to the frequency variation.

2. An operating system for predicting collision comprising:
   means for transmitting a first wave generated by an oscillator to a target,
   means for receiving a reflected wave reflected by said target,
   means for branching a part from said first wave generated by said oscillator to obtain a second wave,
   means for causing said second wave to interfere with said reflected wave to produce a first beat wave by Doppler effect,
   means for changing the frequencies of said first and second waves generated by said oscillator at the occurance of a specified phase angle of said first beat wave, and
   means for detecting at least either one of the polarity and the amount of change of phase of a second beat wave generated according to the frequency variation.

3. A vehicle mounted system for detecting impending collision between the vehicle and a target comprising oscillator means for generating a first signal of a predetermined frequency, transmission means for converting said first signal to a first wave and directing said first wave toward a target, receiver means for receiving a reflected wave reflected by the target and converting it to a reflected signal, branching means for branching a part from said first signal generated by said oscillator to obtain a second signal, combining means for causing said second signal to interfere with said reflected signal to produce a first beat signal by Doppler effect, adjustment means responsive to a predetermined phase angle of said first beat signal for altering the predetermined frequency of said oscillator so that modulated first and second signals are formed, said transmission means converting said modulated first signal to a modulated first wave and directing said modulated first wave toward a target and said receiver means receiving a modulated reflected wave and converting it to a modulated reflected signal, said branching means forming a second modulated signal and said combining means causing said second modulated signal to interfere with said reflected modulated signal to form a second beat signal, and detector means for detecting at least either one of the polarity and amount of change of phase of said second beat wave.

4. A system in accordance with claim 3 in which said oscillator includes a varactor diode in which said adjustment means comprises means for varying a voltage applied to said varactor diode to thereby vary the frequency output of said oscillator.

5. A system in accordance with claim 4 in which said means for varying the voltage applied to said varactor diode includes a sawtooth voltage source for varying the voltage applied to the varactor diode in a linear fashion with time to thereby vary the frequency output of said oscillator in a linear fashion with time.

* * * * *